United States Patent Office 3,624,914
Patented Dec. 7, 1971

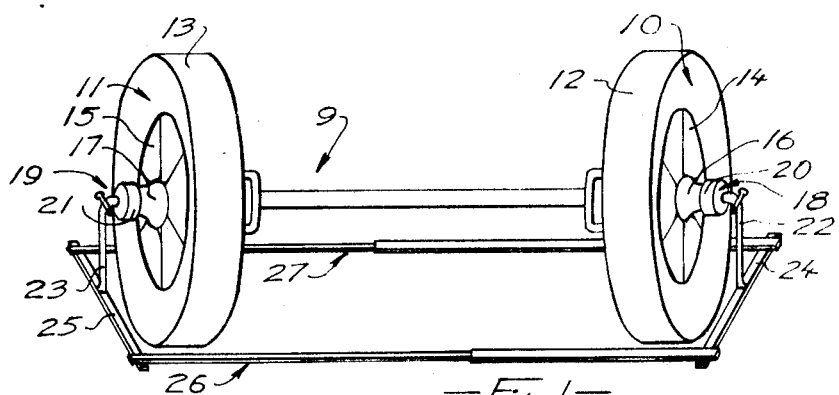
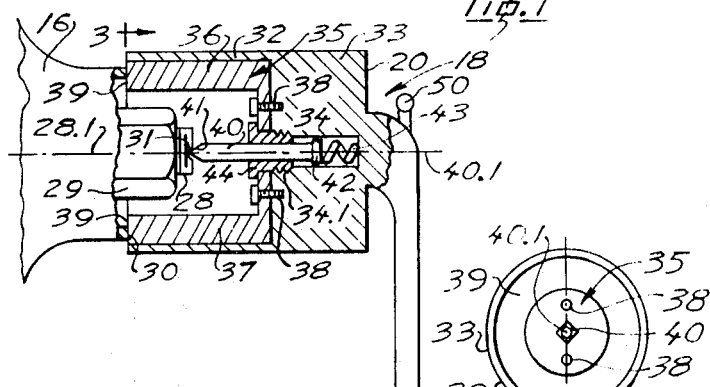
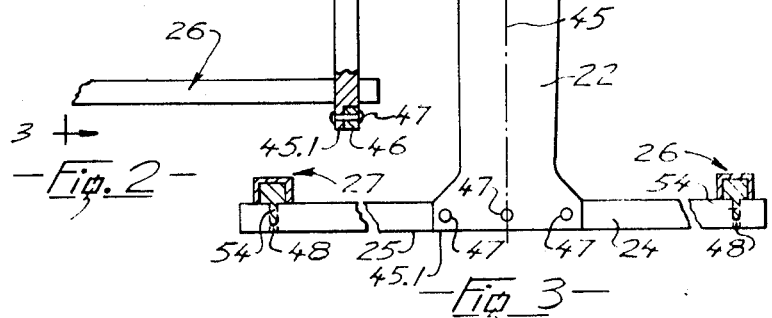
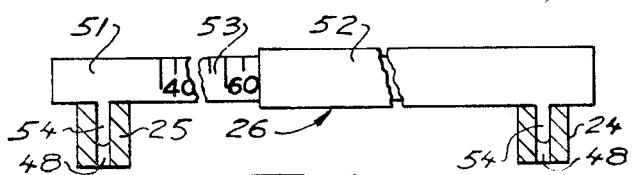

1

3,624,914
APPARATUS FOR MEASURING WHEEL
ALIGNMENT
Henry Kosteriva, Victoria, British Columbia, Canada, assignor to K. and R. Industries Ltd., Victoria, British Columbia, Canada
Filed Dec. 1, 1969, Ser. No. 881,017
Int. Cl. G01b 5/24
U.S. Cl. 33—203.2                      1 Claim

ABSTRACT OF THE DISCLOSURE

Apparatus for measuring the toe of front wheels of an automotive vehicle, a pair of hub engaging members adapted magnetically to cling to the wheel hubs. Both members carry supporting bars extending parallel to hubs of the wheels, and measuring rods adapted to be extended transversely across front and back ends of the supporting bars for determining toe of the wheels.

BACKGROUND OF THE INVENTION

Field of the invention

The invention relates to apparatus for measuring the toe of front wheels of automotive motor vehicles.

Prior art

As is well known to those skilled in the art, in optimum alignment front wheels of the motor vehicle are not in parallel fore and aft relationship but are toed in. The toe varies with different makes of automobiles but in all cases is small, the difference between fore and aft transverse measurements taken from bead to bead of the tires being of the order of between $\frac{1}{16}$ inch and $\frac{1}{8}$ inch, the tires being true.

Due to manufacturing inaccuracies in tire manufacture measurements taken from bead to bead of the tires cannot be relied upon to establish desired toe in. Alignment apparatus has been devised to use wheel hubs as measurement bases as the hubs present faces which are normal to rotational axes of the wheels.

Because of the difference in size and shape of hubs as between various makes of automotive vehicles, centering of prior art apparatus relative to the rotational axes of the vehicles presents problems.

SUMMARY OF THE INVENTION

To measure toe of front wheels of automotive vehicles, the present invention provides apparatus which is magnetically applied directly to machined outer faces of front wheel hubs for holding a pair of support members horizontally and parallel to the wheels so that toe of the wheels can be determined from measurements taken between the support members.

The apparatus of the present invention automatically centers itself relative to the rotational axes of the wheels, independently of the hubs.

The apparatus of the present invention includes a pair of magnetized head members adapted to cling magnetically against end faces of the wheel hubs, means extending centrally from the head members adapted for centering engagement with wheel spindles so as to center the head members on the hubs, arms extending laterally from each of the head members, support members connected to the arms and extending parallel to outer faces of the wheel hubs, said support members extending front and rear beyond the periphery of tires on the wheels and measuring means adapted to be extended in parallelism between front end and rear ends of the support members for determining toe of the wheels.

2

A detailed description following, related to the drawings, gives exemplification of preferred embodiment of the invention which however, is capable of expression in structure other than that described and illustrated.

DESCRIPTION OF THE DRAWINGS

FIG. 1 is a view of a pair of front wheels of an automotive vehicle with alignment apparatus of the invention thereto attached, toe being greatly exaggerated,
FIG. 2 is an enlarged broken vertical sectional view of a portion of the apparatus associated with one wheel of the vehicle,
FIG. 3 is a side view taken from line 3—3 of FIG. 2,
FIG. 4 is an enlarged side view of a measuring rod.

DETAIL DESCRIPTION

FIG. 1

FIG. 1 illustrates alignment apparatus 9 in association with front wheels 10 and 11 of an automotive vehicle, the wheels have dirigible tires 12 and 13 mounted on rims 14 and 15 respectively, the rims having centrally located hubs 16 and 17, respectively. The wheels are shown in a much exaggerated toe-in position.

The alignment apparatus includes hub engaging members 18 and 19 engaged with the hubs 16 and 17, respectively. The hub engaging members 18 and 19 are the same, having magnetic heads 20 and 21, respectively, and arms 22 and 23, respectively, extending radially from the heads in vertically depending positions. Supporting bars 24 and 25 termed respectively, in the claims first and second supporting bars are secured at their middle lengths at lower ends of the arms 22 and 23, the bars extending perpendicular to the arms and parallel to their respective wheels. The bars, which are of equal length, are long enough to project both fore and aft beyond the tires. A measuring rod 26 extends between front ends of the supporting bars and a measuring rod 27 extends parallel to the rod 26, between rear ends of said bars.

FIGS. 2 AND 3

FIG. 2 illustrates hub engaging member 18 in position against the wheel hub 16. Hub 16 is conventionally mounted for rotation on a wheel spindle 28, having an axis 28.1. The spindle has a nut 29 threaded thereon for holding the wheel 10 in place. As is conventional, both the spindle 28 and the nut 29 project outwards of the hub.

Hub 16, as is common with wheel hubs of automotive vehicles, has a machined face 30 which, regardless of wheel irregularities, is normal to the axis of the spindle, and is therefore normal to the rotational axis of the wheel. The spindle 28 as is usual has a centering hole 31.

The head 20 of the hub engaging member 18 is cup shaped having an annular side wall 32 extending from a thick base 33 having a central axially extending blind bore 34 with internal threads 34.1.

A cup shaped magnet 35 having a thick cylindrical side wall 36 extending from a base 37 fits into the head 20. The base 37 has a central hole, and is secured to the head by screws 38. The magnet has a machined annular end face 39 which is adapted, as illustrated in FIG. 2, to fit flush against, and cling to, the machined face 30 of the hub, the cup shape of the magnet providing clearance for the spindle and nut.

A locating pin 40 having an axis 40.1 and a pointed outer end 41 and a button 42 at an inner end fits in the base for axial movement and projects outwardly of and centrally of the magnet through a sleeve 44 engaging the internal thread 34.1 of the bore. A compression spring 43 in the bore extends between the bottom of the bore and the button of the locating pin, normally urging the locating pin to an extended position centrally of the magnet limited by engagement of the button with the sleeve 44. The locating pin has a length such that, with the end face of the magnet engaged with the face of the hub, the pointed end of the locating pin seats itself in the centering hole 31 of the spindle. As the locating pin is slidable of the bore, it will adjust itself axially to accommodate spindle and hub arrangements of most automotive vehicles. The locating pin centers the head relative to the rotational axis of the wheel regardless of possible minor irregularities which may be present in the hub.

As best seen in FIG. 3, the arm 22 which is symmetrically shaped about a longitudinal centerline 45 extends radially from the base 33 of the head 20, and intersects the axis, produced, of the locating pin. The arm 22 is normally disposed in the vertically depending position and its length is a little less than the outside radius of the tire 12 so that a lower end 45.1 is clear of a floor on which the vehicle is standing. At its lower end the arm 22 is provided with a transversely extending machined surface 46, FIG. 2, in a plane parallel to the machined end face 30 of the magnet. The supporting bar 24 is secured by rivets 47 against the machined surface 46, so as to extend parallel to the end face 39 of the magnet and perpendicular to the centerline 45 of the arm.

The supporting bar 24 is provided with upward opening vertical sockets 48 adjacent its ends, the sockets being spaced equidistantly from the center of the bar.

A spirit level 50 is secured to the arm 22, see FIG. 2, to enable the supporting bars 24, 25 to be set horizontally.

FIG. 4

The measuring rod 26 is, as seen in FIG. 4, of telescopic construction having an inner section 51 slideable of an outer section 52. The inner section 51 is provided with a scale 53 by means of which the length of the rod can be determined by a mechanic who may be working beneath the automobile. Depending pins 54 adapted to fit the sockets 48, project laterally adjacent outer ends of both sections.

The measuring rod 27 is similar to the rod 26.

OPERATION

In carrying out a toe adjustment operation the automotive vehicle is positioned on a substantially horizontal work floor with the front wheels in a straight ahead position. Hub caps and dustcaps are removed from the wheels and the hubs and the head engaging members 18 and 19 positioned on the hubs 16 and 17, respectively, as illustrated in FIG. 2 and as herebefore described. The measuring rods 26 and 27 are then positioned transversely of the vehcile, front and back of the wheels, with the depending pins seated in the sockets 48 and the supporting bars horizontally disposed.

The toe of the wheels can then be determined from difference in length of the measuring rods, and suitable adjustments made to obtain the desired toe-in without necessity of moving the alignment apparatus.

What I claim is:

1. Alignment apparatus for measuring toe of front wheels of an automotive vehicle; each wheel having a hub rotatable of an axis of a spindle, each hub having a face normal to the axis of the spindle, each spindle having a centering hole; the apparatus including:
   (a) a pair of head members each having a machined end face adapted to fit each head member flush against and to cling to the face of each hub,
   (b) means engageable with the spindles for centering the head members on the respective hubs,
   (c) an arm extending radially from each of the head members, each arm being adapted to be disposed in a depending position,
   (d) a first supporting bar connected at its middle length to a lower end of one arm extending perpendicular thereto and parallel to the end face of the respective head member,
   (e) a second supporting bar equal in length to the first supporting bar connected, at its middle length, to a lower end of the other arm extending perpendicular thereto and parallel to the end face of its respective head member, the supporting bar extending fore and aft clear of the wheels,
   (f) a pair of telescopic measuring rods each having an inner and an outer section adapted to be extended across fore and aft ends of the supporting bars,
   (g) pins at opposite ends of each of the measuring rods engageable in socketed ends of the supporting bars,
   (h) a scale on the inner seection of each measuring rod so that length of each measuring rod can be determined from a position beneath the vehicle.

References Cited
UNITED STATES PATENTS

| | | | |
|---|---|---|---|
| 2,532,593 | 12/1950 | Bender et al. | 33—203.20 |
| 2,972,189 | 2/1961 | Holub | 33—203.20 X |
| 3,135,052 | 6/1964 | MacMillan | 33—203.20 |
| 3,292,268 | 12/1966 | Knight | 33—203.20 X |
| 3,330,044 | 7/1967 | MacMillan | 33—203.18 |

WILLIAM D. MARTIN, Jr., Primary Examiner

U.S. Cl. X.R.

33—203.18